United States Patent
Kokubo et al.

(10) Patent No.: US 7,757,016 B2
(45) Date of Patent: Jul. 13, 2010

(54) DATA TRANSFER DEVICE, SEMICONDUCTOR INTEGRATED CIRCUIT, AND PROCESSING STATUS NOTIFICATION METHOD

(75) Inventors: Yukiaki Kokubo, Kawasaki (JP); Nina Arataki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 11/984,419

(22) Filed: Nov. 16, 2007

(65) Prior Publication Data

US 2008/0189450 A1    Aug. 7, 2008

(30) Foreign Application Priority Data

Feb. 1, 2007    (JP)    ............... 2007-023367

(51) Int. Cl.
G06F 3/00    (2006.01)
G06F 13/28    (2006.01)

(52) U.S. Cl. .................. 710/22; 710/18; 710/19; 710/48

(58) Field of Classification Search .............. None
See application file for complete search history.

(56) References Cited

U.S. PATENT DOCUMENTS

| 7,007,112 | B2 | 2/2006 | Ishida et al. | |
| 7,237,047 | B2 | 6/2007 | Ishida et al. | |
| 2005/0223136 | A1* | 10/2005 | Tanaka et al. | 710/22 |

FOREIGN PATENT DOCUMENTS

| JP | 57-103530 | 6/1982 |
| JP | 5-257865 | 10/1993 |
| JP | 2000-357147 | 12/2000 |
| JP | 2002-49517 | 2/2002 |
| JP | 2002-344538 | 11/2002 |
| JP | 2003-296140 | 10/2003 |
| JP | 2005-215906 | 8/2005 |

OTHER PUBLICATIONS

Japanese Office Action mailed on Feb. 3, 2009 in corresponding Japanese Patent Application 2007-023367.

* cited by examiner

*Primary Examiner*—Alan Chen
(74) *Attorney, Agent, or Firm*—Staas & Halsey LLP

(57) ABSTRACT

According to an aspect of an embodiment, a data transfer device comprises a plurality of transfer circuits managed by a processor, a request accepting unit, a status information collecting unit and a notification data generating unit. The plurality of transfer circuits each controls transfer of data. The request accepting unit accepts a transfer request from at least one of the plurality of transfer circuits. The status information collecting unit collects status information indicating status of data transfer relating to all of the plurality of transfer circuits, upon acceptance of the transfer request. The notification data generating unit generates notification data including information of the transfer circuit regarding which the request accepting unit has received the transfer request and status information collected by the status information collecting unit. And the notification data generating unit transmits the generated notification data to the processor.

9 Claims, 9 Drawing Sheets

TOP

⟵ BTM

| DMA CIRCUIT #1 | DMA CIRCUIT #2 | ......... | DMA CIRCUIT #N |
|---|---|---|---|
| 0 | 1 | ......... | 0 |

DATA TRANSFER DEVICE, SEMICONDUCTOR INTEGRATED CIRCUIT, AND PROCESSING STATUS NOTIFICATION METHOD

BACKGROUND OF THE INVENTION

1. Field of the Invention

The present invention relates to a data transfer device, a semiconductor integrated circuit, and a processing status notification method for controlling transfer of data.

2. Description of the Related Art

As the processing capability of computers has been improving in recent years, the amount of data used by computers is constantly ballooning, and storage for storing massive amounts of data is being studied. Specifically, a technology has been established called RAID (Redundant Array of Independent Disks) for example, whereby a disk system which realizes high speed, great capacity, and high reliability, can be constructed by combining multiple had disk drives.

In disk systems such as the aforementioned RAID and so forth, a disk array device having multiple disks for storing data accepts commands from a host computer or the like which is a higher-level device, whereby writing (write) and reading (read) of data is performed. At this time, in general arrangements, the data exchanged between the computer and disks is cached in cache memory within the disk array device, and subsequently is read out from this cache memory, in order to attain higher speeds. Also, the host computer is connected to a channel adapter within the disk array device, and data transfer is executed between the host computer and cache memory and disks via this channel adapter.

The channel adapter has a DMA chip such as an LSI (Large Scale Integration) for controlling data transfer by direct memory access (hereafter abbreviated as "DMA"), with the DMA chip executing data transfer in accordance with commands from a CPU (Central Processing Unit). Generally, with data transfer by DMA, a command (descriptor) from the CPU to the DMA chip and the data being transferred share the same bus. FIG. 1 shows a configuration example of a channel adapter having such a bus.

In FIG. 1, the host computer 1 is connected with the interface 2 of a channel adapter, and cache memory 7 is connected with a DMA chip 3 of the channel adapter. Also, a data buffer 4 for temporarily holding data being transferred is connected to the DMA chip 3, with the interface 2, DMA chip 3, and CPU 5 which issues commands to the DMA chip 3, being mutually connected by a bus 6.

With a channel adapter having such a configuration, upon a read command for data being output from the host computer 1 for example, the read command is notified to the CPU 5 via the interface 2 and the bus 6, and a command is output from the CPU 5 to the DMA chip 3 to the effect that data is to be read out from the cache memory 7. Upon receiving this command, the DMA chip 3 reads out data from the cache memory 7 and holds this in the data buffer 4. Subsequently, the DMA chip 3 notifies the CPU 5 to the effect that data readout to the data buffer has been computer, and the CPU 5 starts data transfer processing for transferring data from the data buffer 4 to the host computer 1 via the bus 6.

Now, there are cases wherein multiple DMA circuits are provided to such a DMA chip. In this case, each DMA circuit reads data out from the cache memory to the data buffer in parallel, and upon the data to be transferred to the host computer for example being hold in the data buffer and being in a transferable state, notifies the CPU to the effect that the data can be transferred. This notification is transmitted to the CPU via the bus as an interruption signal requesting interruption processing, so even in the event that the CPU performs data transfer processing relating to another DMA circuit, the CPU interrupts the data transfer processing. The CPU then reads the information relating to the transfer of data held in the DMA circuit which has transmitted to the interruption signal.

Specifically, as shown in FIG. 2, upon readout of data from the cache memory being completed at a DMA circuit within the DMA chip, an interruption signal is transmitted to the CPU via the bus (Step S1). The CPU interrupts all other processing and reads the address of the data to be transferred that is held b the DMA circuit which transmitted to the interrupt signal (step S2). This read causes the address of the data to be transferred to be transmitted from the DMA circuit to the CPU via the bus (step S3), and the CPU resumes data transfer processing.

Subsequently, upon all data transfer processing being completed, the CPU reads transfer status information held in the DMA circuit, indicating whether or not the transfer has been successfully completed (step S4). This read causes the transfer status information to be transmitted from the DMA circuit to the CPU via the bus (step S5).

SUMMARY OF THE INVENTION

According to an aspect of an embodiment, a data transfer device comprises a plurality of transfer circuits managed by a processor, a request accepting unit, a status information collecting unit and a notification data generating unit. The plurality of transfer circuits each controls transfer of data. The request accepting unit accepts a transfer request from at least one of the plurality of transfer circuits. The status information collecting unit collects status information indicating status of data transfer relating to all of the plurality of transfer circuits, upon acceptance of the transfer request. The notification data generating unit generates notification data including information of the transfer circuit regarding which the request accepting unit has received the transfer request and status information collected by the status information collecting unit. And the notification data generating unit transmits the generated notification data to the processor.

Accordingly, in the event that a transfer request has been issued from a transfer circuit, information necessary for the transfer of notification data is all notified to the processor even without the processor performing a read operation regarding the transfer circuit, thereby reducing the processing load on the processor and reducing occupancy of the bus by processing other than data transfer, thus executing speedy data transfer.

DESCRIPTION OF THE PREFERRED EMBODIMENTS

The following is a detailed description of an embodiment of the present embodiment, with reference to the drawings.

Figure 1:
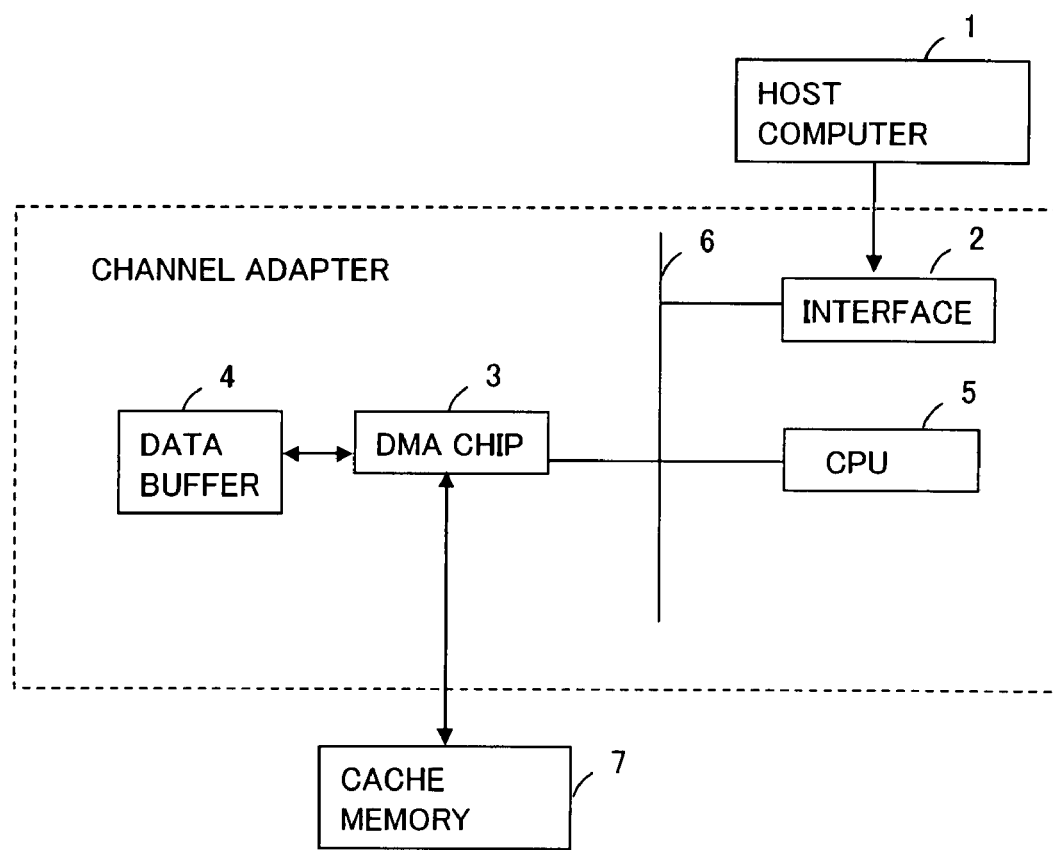
FIG. 1 is a block diagram illustrating a configuration example of a data transfer device having a bus according to a prior art.
Figure 2:
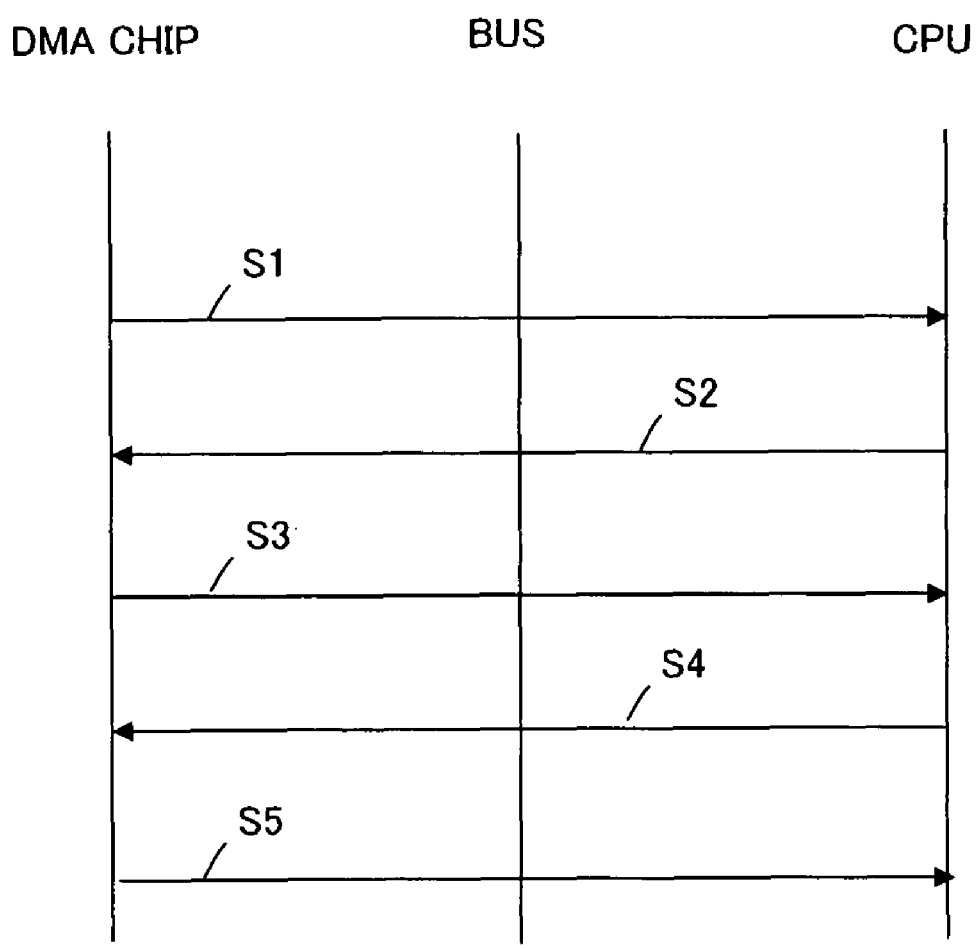
FIG. 2 is a sequence diagram illustrating interruption processing at the time of data transfer according to a prior art.
Figure 3:
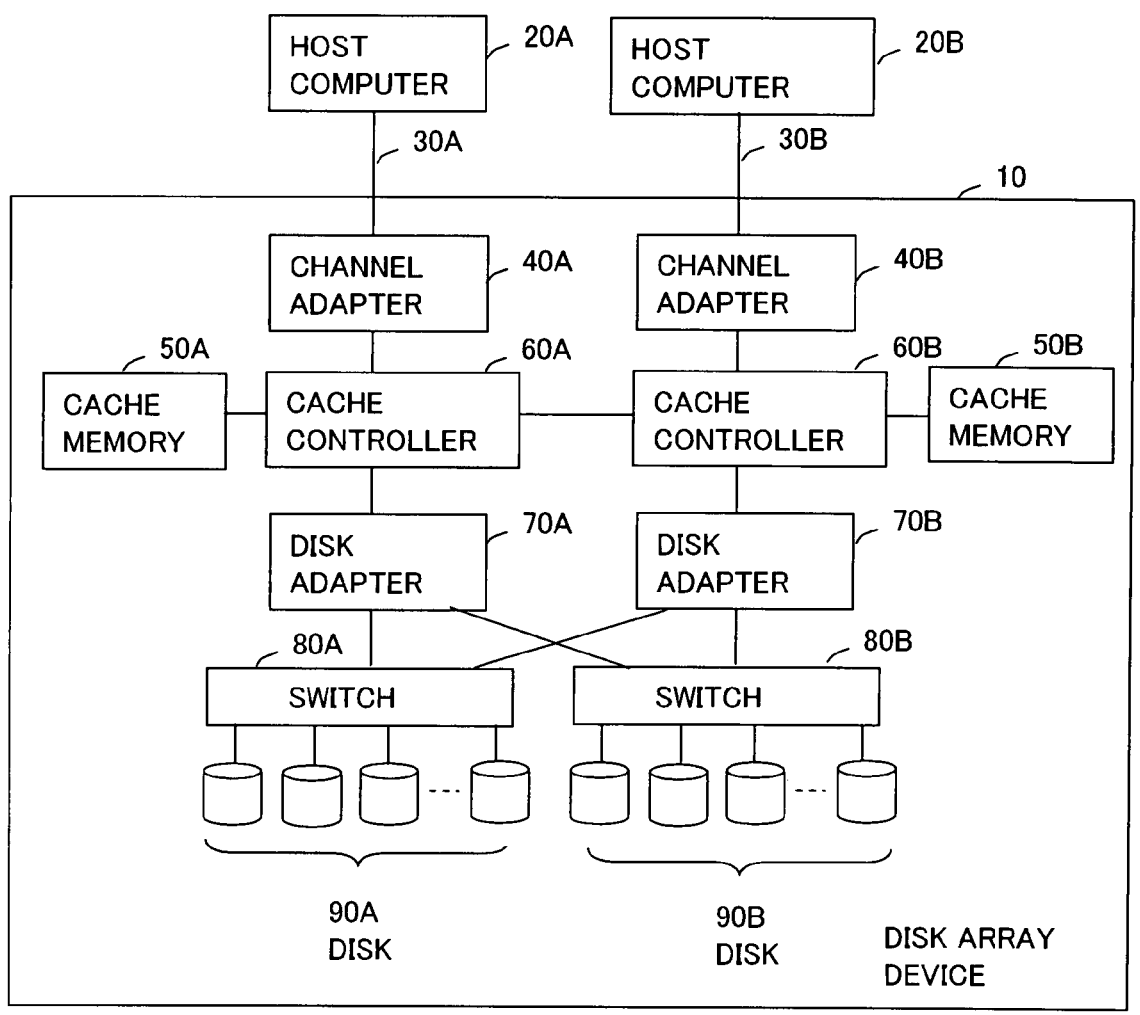
FIG. 3 is a block diagram illustrating a schematic configuration of a disk array device according to an embodiment of the present invention.

FIG. 3 is a block diagram illustrating a schematic configuration of a disk array device 10 according to an embodiment of the present invention. The disk array device 10 shown in the drawing is an example of a computer system to which DMA is applied, being connected to host computers 20A and 20B via fiber channel links 30A and 30B. The disk array device 10 assumes a duplex configuration to ensure high reliability, with two systems of all components being provided (distinguished by the "A" and "B" following each reference numeral in the drawing). Each component of each of the systems has equivalent functions to that of the other, and accordingly, only components of one system will be described below.

The disk array device 10 includes a channel adapter 40A, cache memory 50A, a cache controller 60A, a disk adapter 70A, a switch 80A, and disks 90A.

The channel adapter 40A functions as a communication interface for exchanging data with the host computer 20A, and has an LSI for performing data transfer by DMA. With the present embodiment, a case will be described primarily regarding transferring data stored in the cache memory 50A being transferred to the host computer 20A by the channel adapter 40A. At this time, at the channel adapter 40A, the LSI reads out data from the cache memory 50A under a command from the CPU, and the data that has been read out is transferred to the host computer 20A by data transfer processing of the CPU. Specific configuration and operations of the channel adapter 40A will be described later in detail.

The cache memory 50A temporarily stores data to be written from the host computer 20A to multiple disks 90A, and data to be read out from the multiple disks 90A to the host computer 20A.

The cache controller 60A manages and controls writing and readout of data at the cache memory 50A. Note that the cache controller 60A is connected with the cache controller 60B of the other system by an inter-cache link, so that data written to the cache memory 50A and 50B is shared.

The disk adapter 70A functions as a communication interface for exchanging data with the multiple disks 90A. That is to say, the disk adapter 70A transmits data read out from the cache memory 50A to the multiple disks 90A, and receives from the multiple disks 90A data to be written to the cache memory 50A.

The switch 80A connects the multiple disks 90A and switches over connection between each disk and the disk adapter 70A. The multiple disks 90A are configured of multiple hard disks for example, with each disk storing data to be transferred.

Figure 4:
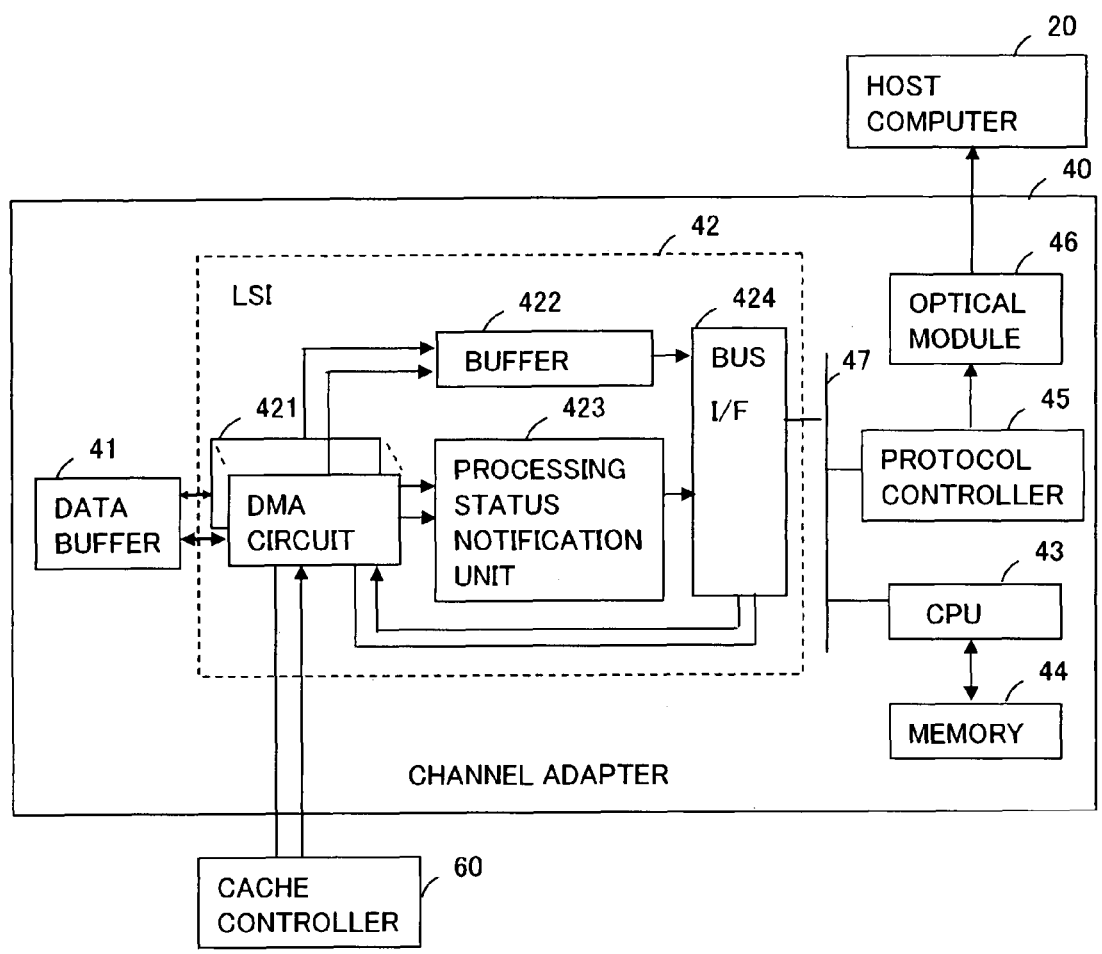
FIG. 4 is a block diagram illustrating the internal configuration of a channel adapter according to the embodiment.

FIG. 4 is a block diagram illustrating the internal configuration of the channel adapter 40A according to the present embodiment. Here, the symbols "A" and "B" in FIG. 3 are omitted, so that the host computers 20A and 20B are denoted simply as "host computer 20" for example. The channel adapter 40 shown in FIG. 4 includes a data buffer 41, LSI 42, CPU 43, memory 44, protocol controller 45, optical module 46, and bus 47.

The data buffer 41 temporarily holds data which the LSI 42 has read out from the cache memory via the cache controller 60.

The LSI 42 has multiple DMA circuits 421, and stores data to be transferred, that has been read out from the cache memory via the cache controller 60, in the data buffer 41, under commands from the CPU 43. When the state is such that the data to be transferred is capable of being transferred, the LSI 42 transmits notification data indicating the processing status at each DMA circuit 421 to the CPU 43. Specifically, the LSI 42 has multiple DMA circuits 421, a buffer 422, a processing status notification unit 423, and a bus interface (hereafter abbreviated to "bus I/F") 424.

The multiple DMA circuits 421 each have interface functionality for communication with the cache memory 50 connected to the cache controller 60, and DMA functions. A DMA circuit 421 performs communication processing with cache memory 50 via the cache controller 60, and reads out the data cached in the cache memory 50 and stores this in the buffer 41, in accordance with commands from the CPU 43. Upon storing in the cache memory data to be transferred to the host computer 20, each DMA circuit 421 transmits a request to the processing status notification unit 423, requesting data transfer execution. In the event that the CPU 43 instructs data transfer in response to this request, the data stored in the data buffer 41 is sent to the buffer 422, and sequentially transferred to the host computer 20.

Now, a DMA circuit 421 holds the top address (hereafter denoted by "TOP") and bottom address (hereafter denoted by "BTM") of the transfer data at the buffer 422, and sequentially transfers the data from the BTM side. Also, each time transfer of data to the host computer 20 ends, the DMA circuit 421 holds information of a transfer state regarding whether or not the data transfer has been performed successfully.

The buffer 422 performs input/output by FIFO (First-In First-Out). That is to say, the buffer 422 inputs transfer data being sent from each of the multiple DMA circuits 421 in order, and outputs the transfer data in the order in which it ways input.

The processing status notification unit 423 accepts a request requesting data transfer execution from each of the multiple DMA circuits 421, generates notification data including information of the DMA circuit 421 which has transmitted this request (hereafter referred to as "transfer-capable DMA information") and the status of data transfer at all DMA circuits 421 (hereafter referred to as "status information"), and transmits this to the CPU 43. Specifics of the processing status notification unit 423 will be described later.

The bus I/F 424 connects the bus 47 with the LSI 42, and acts to send transfer data and notification data output from the buffer 422 and processing status notification unit 423 out onto the bus 47, and to receive transmission complete notifications of notification data returned from the bus 47.

The CPU 43 is a processor which centrally controls the entire channel adapter 40, and interprets commands from the host computer 20 and outputs commands for data transfer to the DMA circuits 421. Also, the CPU 43 comprehends whether or not there is a DMA circuit 421 which is data-transfer-capable, based on communication data transmitted from the LSI 42, and also comprehends the status of data transfer by each DMA circuit 421.

The memory 44 is configured of DRAM (Dynamic Random Access Memory) or the like for example, and stores descriptors generated by the CPU 43 (commands from the CPU 43 to the DMA circuits 421) and so forth.

The protocol controller 45 controls the protocol of the fiber channels (fiber channel links 30A and 30B shown in FIG. 3) used for connection with the host computer 20. The protocol controller 45 outputs data to be transferred to the host computer 20, to the optical module 46 in the form of electrical signals.

The optical module 46 is connected to the host computer 20 and converts optical signals sent from the host computer 20 over optical fiber and the like into electrical signals, and also converts electrical signals output from the protocol controller 45 into optical signals and transfers to the host computer.

The LSI 42, CPU 43, and protocol controller 45 are mutually connected by the bus 47, with transfer data, data transfer commands, notification data, and so forth, being exchanged over the bus 47.

Figure 5:
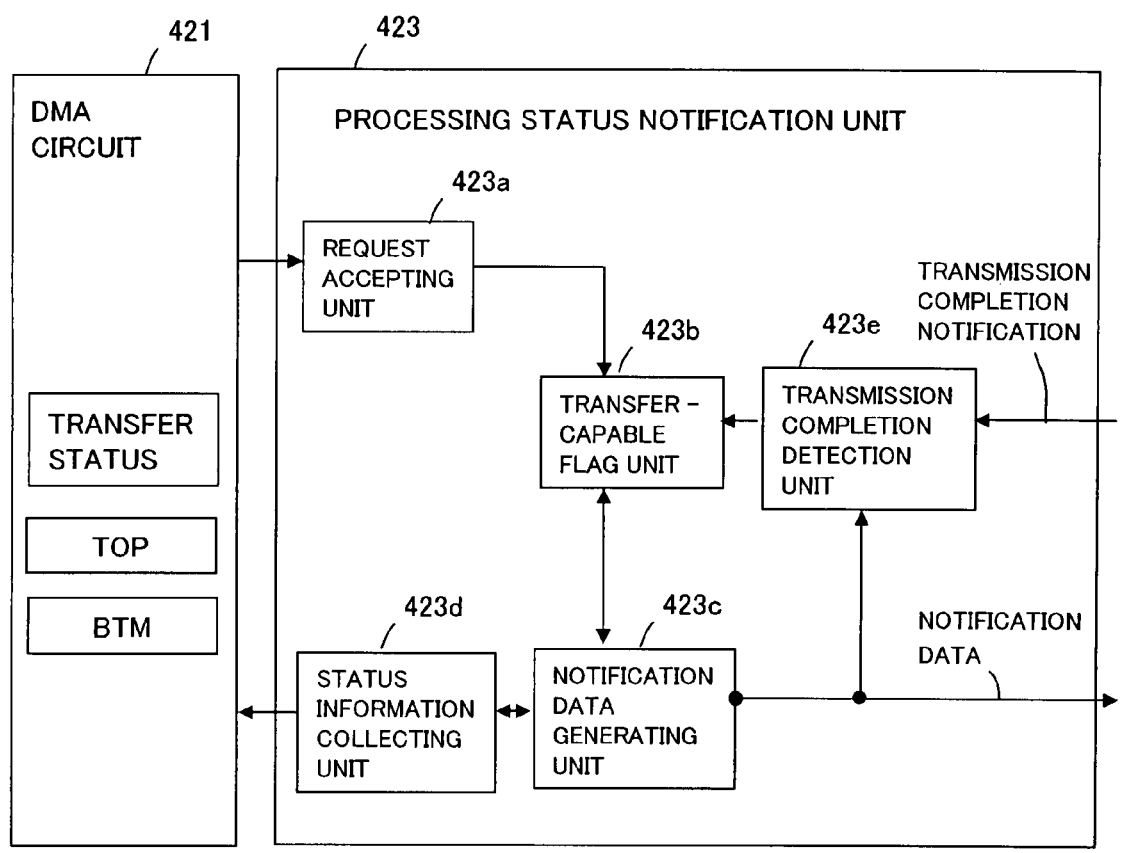
FIG. 5 is a block diagram illustrating the internal configuration of a processing status notification unit according to the embodiment.

FIG. 5 is a block diagram illustrating the internal configuration of the processing status notification unit 423. The processing status notification unit 423 shown in the drawing includes a request accepting unit 423*a*, a transfer-capable flag unit 423*b*, a notification data generating unit 423*c*, a status information collecting unit 423*d*, and a transmission completion detection unit 423*e*.

Figures 6, 7:
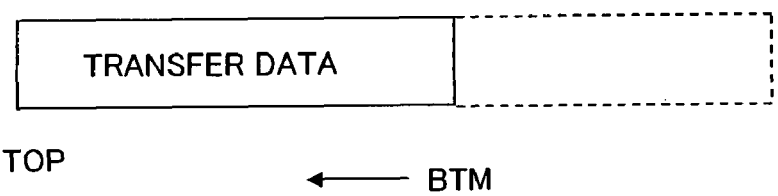
FIG. 6 is a block diagram illustrating an example of transfer data according to the embodiment.
FIG. 7 is a block diagram illustrating an example of a transfer-capable flag according to the embodiment.

Note that FIG. 5 illustrates multiple DMA circuits 421 as a single block. Also, the DMA circuits 421 hold status information such as transfer status of the transfer data, TOP (top address), BTM (bottom address), and so forth. The transfer data stored in the buffer 422, sequentially transferred from the BTM side, and upon transfer of all transfer data being completed, the TOP and BTM agree such as shown in FIG. 6.

The request accepting unit 423*a* accepts transfer execution requests transmitted from each of the multiple DMA circuits 421 in the event the DMA circuits 421 read out data to be transferred to the data buffer 41. The request accepting unit 423*a* then sets a transfer-capable flag 423*b* at the DMA circuit 421 which has transmitted the request.

The transfer-capable flag 423*b* has flags corresponding to each of the multiple DAM circuits 421, and sets a flag corresponding to the DMA circuit 421 which has transmitted a transfer-capable request, under instructions from the request accepting unit 423*a*. That is to say, as shown in FIG. 7 for example, in the event that the transfer-capable flag 423*b* has flags corresponding to the N DMA circuits 421 i.e., DMA circuits #1 through #N, and a transfer execution request is accepted from the DMA circuit #2, the flag corresponding to the DMA circuit #2 is set to "1". Also, the transfer-capable flag 423*b* clears the flag corresponding to the DMA circuit 421 regarding which notification has been made to the CPU 43 to the effect that transmission of notification data has been completed and transmission can be performed, under instructions from the transmission completion detection unit 423*e*. That is to say, upon transmission of the notification data corresponding to the request from the DMA circuit #2 having been completed, the flag corresponding to the DMA circuit #2 is cleared to "0".

The notification data generating unit 423*c* constantly monitors the transfer-capable flag 423*b*, and upon a flag being set for any one of the DMA circuits 421, the notification data generating unit 423*c* generates notification data including transfer-capable DMA information and status information. Specifically, the notification data generating unit 423*c* obtains transfer-capable DMA information relating to a DMA circuit 421 regarding which transfer has been enabled, from the transfer-capable flag 423*b*, instructs the status information collecting unit 423*d* to collect status information, and thus obtains status information relating to all of the DMA circuits 421.

Figure 8:
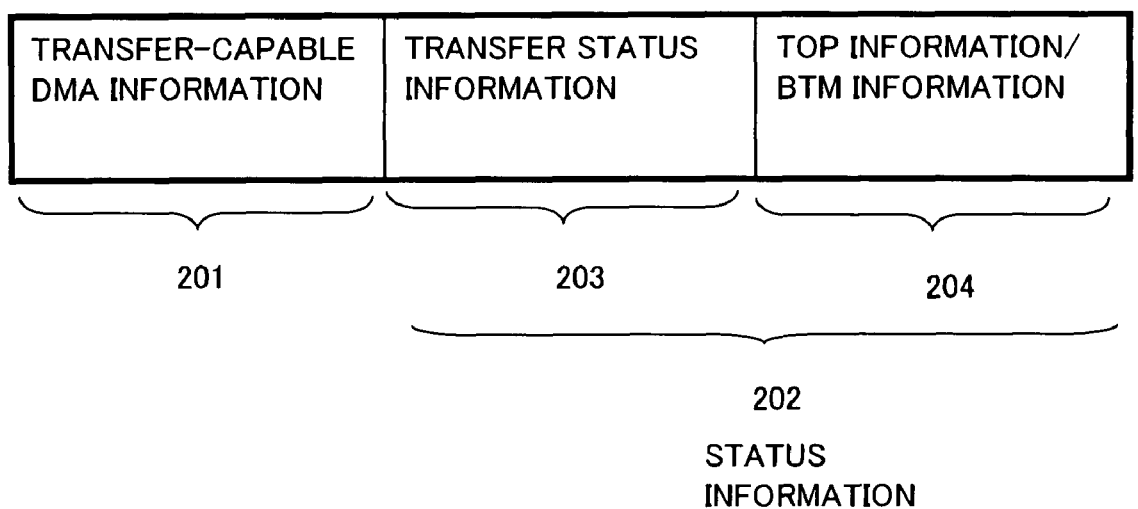
FIG. 8 is a block diagram illustrating an example of notification data according to the embodiment.

The notification data generating unit 423*c* generates notification data such as shown in FIG. 8, for example. The generated notification data includes information indicating the DMA circuit regarding which the transfer-capable flag 423*b* has been set, as transfer-capable DMA information 201, and the transfer status information 203 and TOP information/BTM information 204 held for all DMA circuits, as status information 202. Also, the notification data generating unit 423*c* transmits generated notification to the CPU 43, indicating that the data is interruption processing.

The status information collecting unit 423*d* follows instructions from the notification data generating unit 423*c* to collect status information for all DMA circuits 421. At this time, the status information collecting unit 423*d* collects the transfer status, TOP, and BTM for also the DMA circuits 421 which have not transmitted a request, i.e., which either are not capable of executing transfer or which are currently executing transfer. Accordingly, transfer statuses can include transfer standby, transfer executing, transfer successfully completed (or unsuccessfully ended) and so forth, depending on the DMA circuit 421. Also, while the TOP and BTM do not agree for DMA circuits 421 which are currently executing transfer, they will agree for DMA circuits 421 regarding which transfer has been successfully completed.

Note that an arrangement may be made wherein the status information collecting unit 423*d* further collects check code generated from transferred data or header information of the transferred data, as information indicating the transfer status.

Upon all notification data being transmitted to the CPU 43 via the bus 47, the transmission completion detection unit 423*e* receives a transmission completion notification to that effect from the bus 47, and thus detects that transmission of the notification data has been completed. The transmission completion detection unit 423*e* then clears the transfer-capable flag 423*b* corresponding to the DMA circuit 421 regarding which the CPU 43 has been notified that transfer is executable, based on the transfer-capable DMA information included in the notification data.

Figure 9:
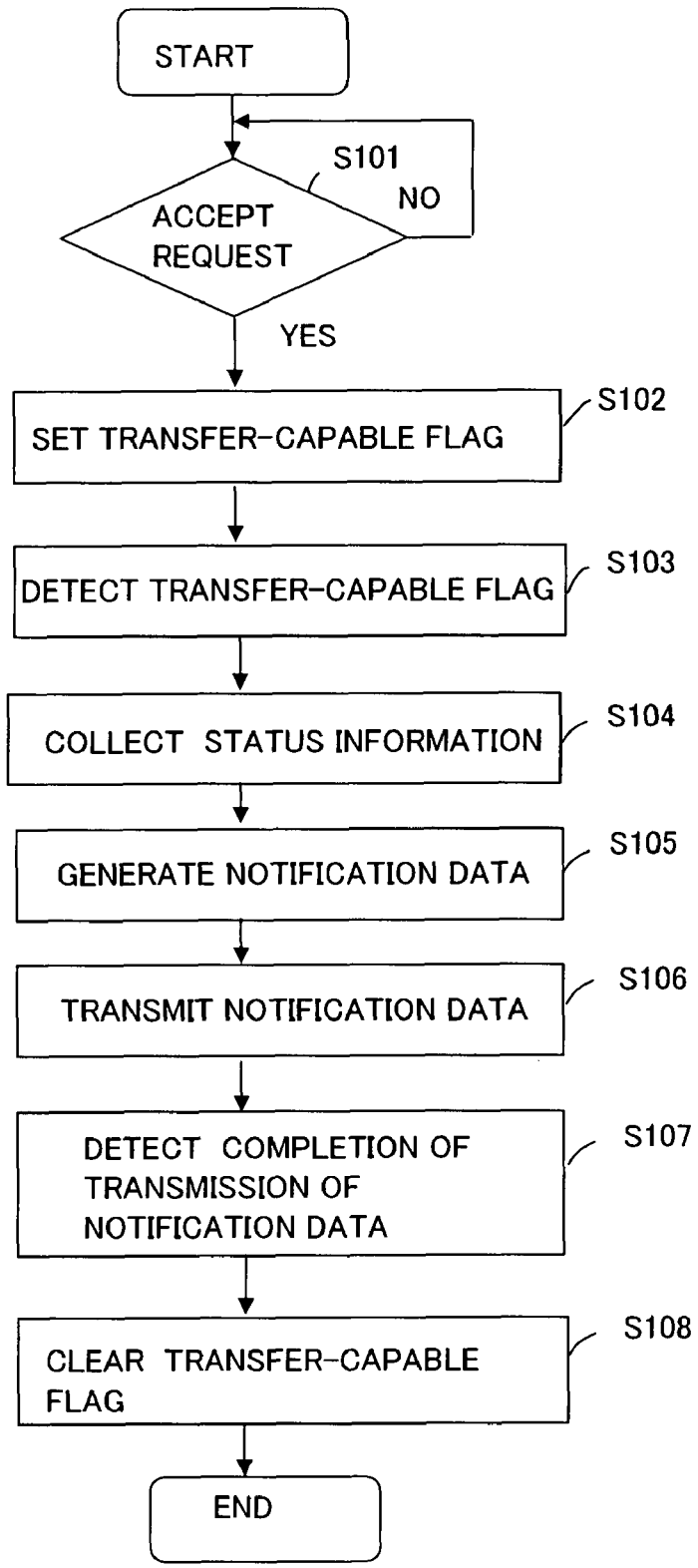
FIG. 9 is a flowchart illustrating a processing status notification method according to the embodiment.

Next, a processing status notification method of the processing status notification configured as described above will be described with reference to the flowchart in FIG. 9.

The processing status notification unit 423 stands by for a request from the DMA circuits 421 (step S101), and upon any one of the DMA circuits 421 reading data to be transferred to the data buffer 41 and transmitting a request (Yes in step S101), the request is accepted by the request accepting unit 423*a*, and a transfer-capable flag 423*b* corresponding to the DMA circuit 421 which has transmitted the request is set by the request accepting unit 423*a* (step S102). Subsequently, the request accepting unit 423*a* does not accept a request from the DMA circuit 421 regarding which the transfer-capable flag 423*b* has been set, until this transfer-capable flag 423*b* is cleared.

Also, the notification data generating unit 423*c* constantly monitors the transfer-capable flag 423*b*, and upon detecting that a transfer-capable flag 423*b* corresponding to one or more DMA circuits 421 has been set (Step S103), the notification data generating unit 423*c* instructs the status information collecting unit 423*d* to collect status information. The status information collecting unit 423*d* collects status information of all of the DMA circuits 421 (i.e., transfer status information, TOP information, and BTM information) (step S104), and the collected information is output to the notification data generating unit 423*c*.

The notification data generating unit 423c generates notification based on the transfer-capable DMA information indicating the DMA circuits regarding which a flag has been set at the transfer-capable flag 423b and the status information output from the status information collecting unit 423d (step S105). At this time, in the event that requests have been simultaneously transmitted from multiple DMA circuits 421, the transfer-capable DMA information indicates all of these DMA circuits 421 since a transfer-capable flag 423b has been set corresponding to each of the DMA circuits 421. The generated notification data is transmitted to the CPU 43 from the bus I/F 24 via the bus 47 (step S106). The notification data is also output to the transmission completion detection unit 423e.

With the present embodiment, the notification data includes transfer-capable DMA information relating to the DMA circuits 421 which have transmitted a transfer execution request and status information relating to all DMA circuits 421, so transmitting the notification data to the CPU 43 means that there is no need for the CPU 43 to read TOP or BTM from the DMA circuits 421 again, thereby reducing processing load on the CPU 43 and also reducing occupancy of the bus 47 for processing other than data transfer. That is to say, upon any one of the DMA circuits 421 issuing a request, status information relating to all of the DMA circuits 421 is notified to the CPU 43, so even though the CPU 43 does not query the DMA circuits 421 regarding transfer status at the time of data transfer being completed at the DMA circuits 421, the transfer status will be notified to the CPU 43 at the time of another of the DMA circuits 421 issuing a request or the like.

Also, if requests have been issued from multiple DMA circuits 421, the CPU 43 can be notified that these DMA circuits 421 are transfer-capable with a single notification, thereby reducing occupancy of the bus 47. Further, generating of notification processing is hardware processing executed at the LSI 42, so this processing is completed in the order of microseconds, and accordingly the status information is notified to the CPU 43 far faster than the CPU 43 reading the status information of the DMA circuits 421 by interruption processing. It should be noted that while increasing the amount of information included in the notification data increases the size of the notification data as a matter of course, this does not affect the bus load very much as long as the size of the notification data is within that which can be transferred in a single sequence, as a general principle. Accordingly, with a PCI-X bus for example, a burst write up to 128 bytes from address boundary has little effect on the load of the bus 47, and the effects of increase in information amount are negligible.

Following transmission of notification data, a transmission completion notification to the effect that transmission of the notification data has been completed is returned to the LSI 42 from the bus 47, so the transmission completion notification is received from the bus I/F 424 by the transmission completion detection unit 423e of the processing status notification unit 423. Thus, the transmission completion detection unit 423e detects completion of transmission of the notification data (step S107), the notification data output from the notification data generating unit 423c is referenced at the time of transmitting the notification data, and the transfer-capable flag 423b corresponding to the DMA circuit 421 indicated in the transfer-capable DMA information is cleared (step S108). Accordingly, the request accepting unit 423a once more will accept a request from the DMA circuit 421 regarding which the transfer-capable flag 423b had been set.

Figure 10:
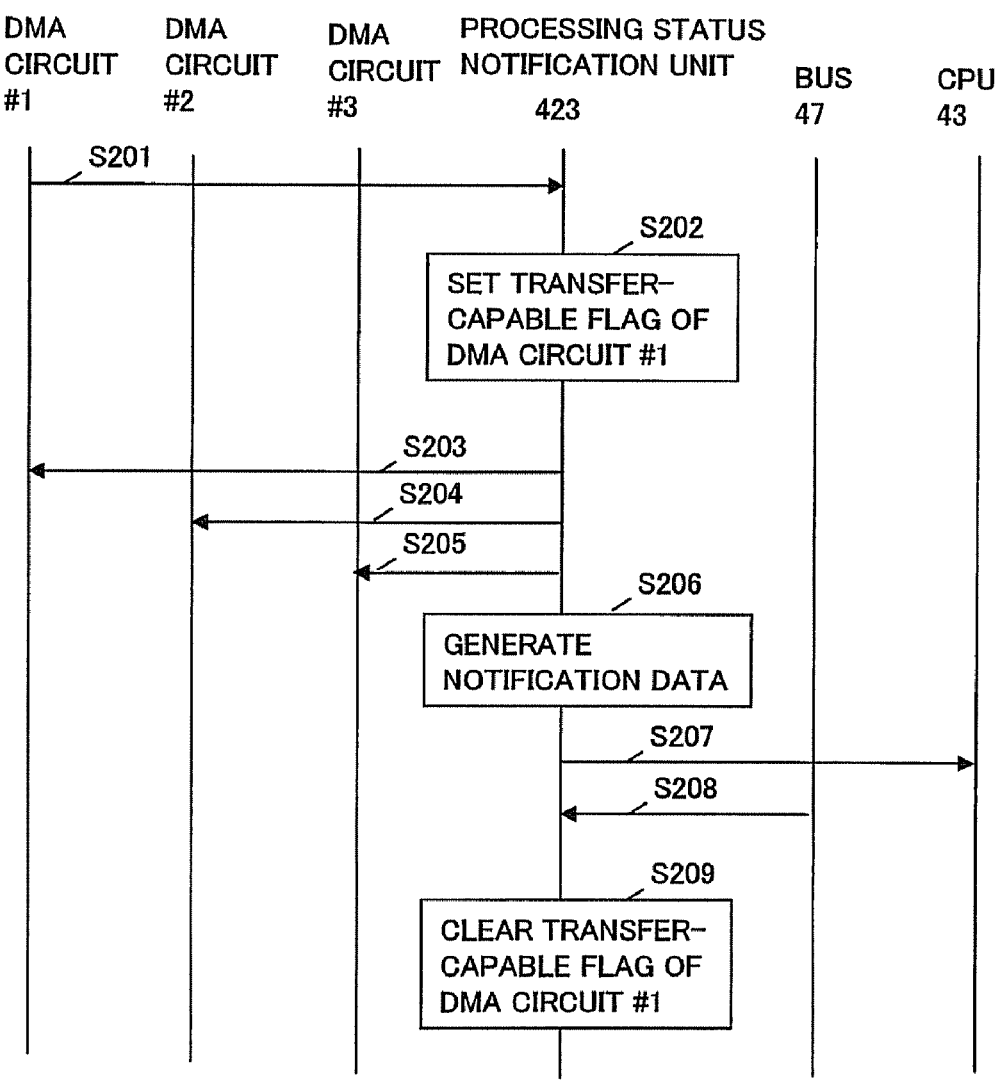
FIG. 10 is a sequence diagram illustrating operations at the time of issuing a data transfer request according to the embodiment.

Next, a specific example of the operations of the processing status notification unit 423 in a case that a request has been issued from the DMA circuit 421 will be described with reference to the sequence diagram shown in FIG. 10. FIG. 10 assumes a situation wherein three DMA circuits 421, DMA circuits #1 through #3, are provided to the LSI 42.

While the DMA circuits #1 through #3 perform data transfer whenever issued a command from the CPU 43, we will consider a case where wherein the DMA circuit #1, for example, executes data transfer to the host computer 20 under command from the CPU 43. At this time, the DMA circuit #1 reads out data to be transferred from the cache memory via the cache controller 60, and stores in the data buffer 41. Upon preparation for data transfer being completed, a transfer execution request is transmitted to the processing status notification unit 423 (step S201).

This request is accepted by the request accepting unit 423a, and a transfer-capable flag 423b is set corresponding to the DMA circuit #1 (step S202). Upon setting of the transfer-capable flag 423b being detected by the notification data generating unit 423c, status information is collected by the status information collecting unit 423d. Specifically, the transfer status of the DMA circuit #1, and the TOP and BTM are collected, by the status information collecting unit 423d (step S203), and in the same way, the transfer status and the TOP and BTM of the DMA circuits #2 and #3 are collected (Steps S204 and S205).

Now, the DMA circuit #1 is the DMA circuit which has issued the request, so the transfer status is "transfer standby", and the TOP and BTM do not agree. Also, the DMA circuits #2 and #3 have not issued requests, so the statuses thereof are either "transfer successfully completed (or unsuccessfully ended)" meaning that the previous data transfer has ended or "transfer executing" meaning that transfer is currently being executed, with TOP and BTM agreeing in the case of "transfer successfully completed".

The notification data generating unit 423c generates notification data from status information thus collected and transfer-capable DMA information indicating the DAM circuit #1 regarding which the transfer-capable flag 423b has been set (step S206), and the generated notification data is transmitted to the CPU 43 as an interruption request, via the bus I/F 42 and bus 47 (step S207). Interruption processing occurs at the CPU 43 due to the notification data, a data transfer command is issued to the DMA circuit #1 capable of transfer execution based on the capable-capable DAM information in the notification data, and also, the status information of the other DMA circuits #2 and #3 is managed.

On the other hand, upon transmission of the notification data to the CPU 43, a transmission completion notification is returned to the processing status notification unit 423 from the bus 47 (step S208), and upon the transmission completion detection unit 423e detecting completion of transmission of the notification data by the transmission completion notification, the transfer-capable flag 423b of the DMA circuit #1, which had been described as being a transfer-capable DMA circuit #1 in the notification data, is cleared (step S209). Thus, requests from the DMA circuit #1 are accepted again.

Throughout the entire processing, the only time this processing occupies the bus 47 is when the notification data is transmitted to the CPU 43. This notification data includes transfer-capable DM information indicating all DMA circuits 421 which have issued a request (only the DMA circuit #1 in this case) and status information of all DMA circuits 421 (DMA circuits #1 through #3 in this case), so there is no need for the CPU 43 to read information from each DMA circuit 421, thereby reducing processing load. Also, the number of times of exchanging information between the DMA circuits 421 and the CPU 43 is reduced, thereby reducing occupancy of the bus 47.

Thus, according to the present embodiment, upon a request requesting transfer execution being issued from a DMA circuit, the CPU is notified of the DMA circuit which has issued the request and the transfer status of all DMA circuits, in the form of notification data request interruption processing. Accordingly, all necessary information is notified to the CPU by a single notification data transmission without the CPU reading the DMA circuits, so the processing load on the processor can be reduced and occupancy of the bus by processing other than data transfer can be reduced, thereby enabling speedy data transfer.

Note that while processing has been described with the present embodiment regarding a case in which data in cache memory is transferred to the host computer 20, the present invention can be applied to various situations in which DMA circuits 421 transfer data. Also, an arrangement may be made wherein a processor such as an MPU (Micro Processing Unit) is provided within the channel adapter 40 or cache controller 60 instead of a CPU.

What is claimed is:

1. A data transfer device managed by a processor, the data transfer device comprising:
    a plurality of DMA (Direct Memory Access) circuits for controlling transfer of data, at least one of the DMA circuits transmitting a transfer request upon completion of preparation for data transfer;
    a request accepting unit for accepting the transfer request to the processor from at least one of the plurality of DMA circuits;
    a status information collecting unit for collecting status information indicating status of data transfer relating to all of the plurality of DMA circuits, upon acceptance of the transfer request; and
    a notification data generating unit for generating notification data including information of the DMA circuit relating to the transfer request received by the request accepting unit and status information collected by the status information collecting unit, the notification data generating unit transmitting the generated notification data to the processor as an interruption request.

2. The data transfer device according to claim 1, wherein the status information collecting unit collects a top address and bottom address of data.

3. The data transfer device according to claim 1, wherein the status information collecting unit collects transfer status information indicating whether or not the plurality of DMA circuits has successfully ended the data transfer of each.

4. The data transfer device according to claim 3, wherein the status information collecting unit collects a check code generated from data which the plurality of DMA circuits are to transfer, or header information of data to be transferred.

5. The data transfer device according to claim 1, wherein the request accepting unit includes flags corresponding to each of the plurality of DMA circuits, and set a flag corresponding to the DMA circuit.

6. The data transfer device according to claim 5, wherein the notification data generating unit constantly monitors the flags, and in the event that a new flag has been set, instructs the status information collecting unit to collect the status information.

7. The data transfer device according to claim 5, further comprising a transmission completion detection unit for detecting completion of transmission of notification data from the notification data generating unit to the processor;
    wherein the request accepting unit clears the flag corresponding to the DMA circuit regarding which information is included in the notification data of which completion of transmission has been detected by the transmission completion detecting unit.

8. A semiconductor integrated circuit managed by a processor, comprising:
    a plurality of DMA (Direct Memory Access) circuits each for controlling transfer of data;
    a buffer for performing sequential input/output of data transferred under control of the plurality of DMA circuits; and
    a processing status notification unit for notifying the data transfer processing status regarding all of the plurality of DMA circuits to the processor for managing the plurality of DMA circuits simultaneously, in the event that at least one of the plurality of DMA circuits requests execution of data transfer processing via the buffer upon completion of preparation for data transfer, the processing status notification unit including:
        a request accepting unit for accepting a transfer request to the processor from at least one of the plurality of DMA circuits;
        a status information collecting unit for collecting status information indicating status of data transfer relating to all of the plurality of DMA circuits, upon acceptance of the transfer request; and
        a notification data generating unit for generating notification data including information of the DMA circuit relating to the transfer request received by the request accepting unit and status information collected by the status information collecting unit, the notification data generating unit transmitting the generated notification data to the processor as an interruption request.

9. A processing status notification method for a data transfer device including a plurality of DMA circuits each for controlling transfer of data, said method comprising:
    an accepting process for accepting a transfer request to the processor from at least one of the plurality of DMA circuits upon completion of preparation for data transfer;
    a collecting process for collecting status information indicating the status of data transfer relating to all of the plurality of DMA circuits, in the event that a transfer request has been accepted in the accepting process;
    a generating process for generating notification data including information of a transfer-capable DMA circuit regarding which the transfer request has been received in the accepting process, and status information collected by the status information collecting unit; and
    a transmission process for transmitting notification data generated in the generating process to a processor managing the plurality of DMA circuits as an interruption request.

* * * * *